United States Patent [19]

Takahashi et al.

[11] Patent Number: 5,282,928
[45] Date of Patent: * Feb. 1, 1994

[54] DEINKING COMPOSITION

[75] Inventors: Hiromichi Takahashi; Yoichi Ishibashi; Yoshitaka Miyauchi; Takanobu Shiroishi; Yoshinao Kono, all of Wakayama, Japan

[73] Assignee: KAO Corporation, Tokyo, Japan

[*] Notice: The portion of the term of this patent subsequent to Jun. 9, 2009 has been disclaimed.

[21] Appl. No.: 889,962

[22] Filed: May 29, 1992

[30] Foreign Application Priority Data

May 31, 1991 [JP] Japan .................. 3-129232

[51] Int. Cl.$^5$ .............................. D21C 5/02
[52] U.S. Cl. .......................... 162/5; 162/4; 252/60; 252/174.21; 252/174.22
[58] Field of Search .......... 252/60, 174.21, 174.22, 252/DIG. 2; 162/5, 4

[56] References Cited

U.S. PATENT DOCUMENTS 4,964,439 10/1990 Hamaguchi et al. .............. 162/5
5,120,397 6/1992 Urushibata et al. ............... 162/5

Primary Examiner—Asok Pal
Assistant Examiner—P. Achutamurthy
Attorney, Agent, or Firm—Birch, Stewart, Kolasch & Birch

[57] ABSTRACT

A deinking composition which shows a good deinking performance, a good defoaming property and excellent operation characteristics whereby a deinked pulp having a high whiteness and little contamination with the total remaining ink can be obtained in the reclamation of waste papers by flotation, washing or a combination procedure thereof and wherein the deinking composition comprises a reaction mixture (II), as a deinking agent, obtained by the addition reaction of alkylene oxide (D) with a mixture (I) comprising a fat and oil (A) which is constituted with a mixture of higher fatty acids (a) comprising fatty acids having 8 to 24 carbon atoms; having an average carbon atom number of from 12.7 to 22.5; containing from 9.6 to 70.6% by weight of higher fatty acids having 20 to 24 carbon atoms and having an iodine value (IV) of 70 or less and glycerol (b-1), and/or, a transesterification reaction mixture (B) obtained by reacting the fat and oil (A) with glycerol (b-2), and at least one mono- to tetradecahydric alcohol (C).

7 Claims, No Drawings

DEINKING COMPOSITION

BACKGROUND OF THE INVENTION

1. Field of the Invention

The present invention relates to a deinking composition to be used for the reclamation of waste papers such as newspapers and magazines. More particularly, the present invention relates to a deinking composition whereby a good defoaming property of flotation reject can be achieved and a deinked pulp which is little contaminated with total remaining ink can be obtained by deinking, for example, newspapers and magazines by flotation, washing or a combination thereof.

2. Description of the Related Art

It has been the practice to reclaim waste papers including newspapers, magazines and waste OA papers. Recently the effective utilization of waste papers has become more and more important in conjunction with the problems of the global environment such as the conservation of forest resources and refuse disposal. Further, it has been attempted to utilize a deinked pulp as a pulp of a higher rank, for example, to reclaim newspapers for use in making a paper of intermediate grade.

On the other hand, recent improvements in printing techniques, printing systems and printing ink compositions have made it difficult to deink waste papers. In order to facilitate deinking, therefore, attempts have been made to improve deinking devices and deinking procedures. In order to remove inks and other impurities from waste papers, a deinking composition which comprises alkaline agents such as caustic soda, sodium silicate, sodium carbonate and sodium phosphate, bleaching agents such as hydrogen peroxide, hydrosulfites and hypochlorites, and sequestering agents such as EDTA and DTPA, and deinking agents, either alone or in the form of a mixture thereof, including anionic surfactants such as alkylbenzenesulfonates, higher alcohol sulfates (or half esters of higher alcohols with sulfuric acid ($ROSO_3M$)), $\alpha$-olefinsulfonates and dialkyl sulfosuccinates, nonionic surfactants such as ethylene oxide adducts of higher alcohols, ethylene oxide adducts of alkylphenols, ethylene oxide adducts of fatty acids and alkanolamides, has been used. Although these deinking compositions show excellent foaming properties in the flotation process, their abilities to collect ink are limited. In the washing method, on the other hand, they are poor in detergency and, furthermore, the good foaming properties thereof cause troubles in the effluent disposal step. As a result, only a deinked pulp of low grade can be obtained by using these deinking compositions. Further, a pulp of a high whiteness, if obtained, is contaminated with a large amount of total remaining ink, which restricts the utilization of the deinked pulp (for example, the deinked pulp is employed in a decreased amount for the under surface of cardboard or added in a decreased amount to newspapers). The term "total remaining ink" as used herein means the combined amount of un-liberated ink adhering to the deinked pulp and re-adherent ink which has been once liberated from the pulp but adheres thereto again in the deinking step.

The present inventors previously proposed using a reaction product obtained by the addition reaction of an alkylene oxide with a mixture of a natural fat or a product obtained by previously reacting a natural fat with glycerol and a monohydric or polyhydric alcohol as a deinking agent (refer to Japanese Patent Laid-Open Nos. 239585/1985, 293483/1990, 293484/1990, 293485/1990 and 881/1991, and European Patent Publication-A No. 0241224).

Subsequently, the present inventors have examined in detail the behavior of deinking agents obtained in the deinking step. As a result, they have found out that a deinking agent having a mixing molar ratio of a natural fat to a monohydric or polyhydric alcohol of 1:0.3 to 1:3 shows a poor defoaming property in the flotation reject and, as a result, often causes foaming troubles, and that the deinked pulp obtained with the use of this deinking agent is contaminated with a large amount of the total remaining ink, though it has a high whiteness.

SUMMARY OF THE INVENTION

The present inventors have conducted extensive studies in order to develop a deinking composition which shows a good deinking performance and good operation characteristics, in particular a good defoaming property in the flotation reject, whereby a deinked pulp having little contamination with the total remaining ink can be obtained in the flotation, washing or combination procedure thereof. As a result, the present invention has been completed.

Accordingly, the present invention provides a deinking composition which comprises or consists essentially of a reaction mixture (II) obtained by the addition reaction of alkylene oxide (D) with a mixture (I) comprising or consisting essentially of a fat and oil (A) which is constituted by a mixture of higher fatty acids (a) comprising or consisting essentially of fatty acids having 8 to 24 carbon atoms; having an average carbon atom number of from 12.7 to 22.5; containing from 9.6 to 70.6% by weight of higher fatty acids having 20 to 24 carbon atoms and having an iodine value (IV) of 70 or less and glycerol (b-1), and/or, a transesterification reaction mixture (B) obtained by reacting the fat and oil (A) with glycerol (b-2), and at least one mono- to tetradecahydric alcohol (C).

Namely, the present invention includes a deinking agent which comprises an ester compound obtained by adding alkylene oxide(s) to a mixture of a fat, or a product obtained by previously reacting said fat with glycerol, and at least one mono- to tetradecahydric alcohol, provided that said fat comprises mixed fatty acids, which consist of higher fatty acids having 8 to 24 carbon atoms, have an average carbon atom number of from 12.7 to 22.5, contain from 9.6 to 70.6% by weight of higher fatty acids having 20 to 24 carbon atoms and have an iodine value (IV) of not more than 70, and glycerol.

The fat and oil (A) is preferably constituted by a mixture of higher fatty acids (a) containing from 2.0 to 33.2% by weight of fatty acids having 20 carbon atoms and from 9.5 to 32.0% by weight of fatty acids having 22 carbon atoms and glycerol (b-1).

The fat and oil (A) is preferably constituted by a mixture of higher fatty acids (a) comprising semi-hardened or hardened fish oil fatty acids and glycerol (b-1).

The fat and oil (A) comprises preferably semi-hardened or hardened fish oil.

In order to prepare the mixture (I), the mono- to tetradecahydric alcohol (C) and glycerol (b) in the fat and oil (A) and/or the transesterification reaction mixture (B) may be used at a molar ratio of (C) to (b) of from 0.2/1 to 1/1.

The alkylene oxide (D) is preferably a mixture of ethylene oxide and propylene oxide.

The mono- to tetradecahydric alcohol (C) is preferably glycerol.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Detailed Description of the Invention The fat and oil (A) in the present invention means a fat(s) and/or an oil(s). The fat and oil (A) used in the present invention is constituted by a mixture of higher fatty acids (a) and glycerol (b-1). Namely, the fat and oil (A) is mainly comprised of a mixture of triglycerides which is constituted or composed of a mixture of higher fatty acids (a) and glycerol (b-1), or which is obtained by reacting a mixture of higher fatty acids (a) and/or salts thereof with glycerol (b-1). The fat and oil (A) may include monoglycerides and/or diglycerides.

Since the numerical values specified with respect to the mixture of higher fatty acids (a) and the fat and oil (A) to be used in the present invention are critical ones, no compound similar thereto can exert the remarkable effects of the present invention unless it satisfies the specification of the present invention.

The mixture of higher fatty acids (a) comprises fatty acids having 8 to 24 carbon atoms, has an average carbon atom number of from 12.7 to 22.5, contains from 9.6 to 70.6% by weight of fatty acids having 20 to 24 carbon atoms and has an iodine value (IV) of 70 or less. Each fatty acid comprising the mixture of higher fatty acids (a) may be saturated or unsaturated.

The mixture of higher fatty acids (a) which constitutes the fat and oil (A) together with glycerol (b-1) in the present invention comprises higher fatty acids having 8 to 24 carbon atoms and satisfies the aforesaid specification. It is particularly preferable that the mixture of higher fatty acids (a) contains from 2.0 to 33.2% by weight of fatty acids having 20 carbon atoms and from 9.5 to 32.0% by weight of fatty acids having 22 carbon atoms.

Examples of higher fatty acids include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, linoleic acid, linolenic acid, stearolic acid, ricinolic acid, ricinelaidic acid, nonadecanoic acid, arachidic acid, heneicosanoic acid, behenic acid, brassidic acid, erucic acid, tricosanoic acid and tetracosanoic acid, and, coconut oil fatty acids, beef tallow fatty acids, palm oil fatty acids, tall oil fatty acids, rapeseed oil fatty acids, fish oil fatty acids and those obtained by semi-hardening or hardening these fatty acids can also be used. These fatty acids may be arbitrarily blended within the scope of the present invention. Among these fatty acids, semi-hardened or hardened fish oil fatty acids are particularly preferable from the viewpoints of cost and ease of their use alone. It is also preferable to use semi-hardened or hardened fish oils as the fat and oil (A). Examples of the fish oil described above include cod oil, sardine oil, saury oil, mackerel oil, herring oil, menhaden oil and those recovered from the refining step of these fish oils.

When the average carbon atom number of the mixture of higher fatty acids is smaller than 12.7, the effect of the deinking agent which is an effective component of the deinking composition in aggregating ink becomes deteriorated and, as a result, no deinked pulp of a high b value can be obtained. When the average carbon atom number thereof exceeds 22.5, on the other hand, an insufficient foaming property in the flotation stage makes it difficult to remove the aggregated ink from the system.

When the content of the fatty acids having 20 to 24 carbon atoms is smaller than 9.6% by weight, the effect of the deinking agent in aggregating fine ink becomes deteriorated and thus deinked pulp of a high b value cannot be obtained. When the content of these fatty acids exceeds 70.6% by weight, on the other hand, the deinking ability of the deinking agent is weakened. As a result, the obtained deinked pulp contains a large amount of unliberated ink and thus has a poor appearance.

When the iodine value (IV) of the mixture of higher fatty acids exceeds 70, the use of the deinking agent achieves only an insufficient foaming property in the flotation step and thus the aggregated ink on the foam layer cannot be rejected from the system. As a result, the obtained deinked pulp has a low whiteness. In this case, furthermore, a large amount of total remaining ink is observed in the deinked pulp because a large amount of ink remains unliberated.

When the reaction mixture (II) as a deinking agent which is obtained by using a mixture of higher fatty acids (a) having an iodine value of 5 or less is used in the deinking composition of the present invention, the total remaining ink is substantially reduced and the whiteness of the deinked pulp is elevated. Thus the deinking performance of the deinking agent surprisingly varies depending on the iodine value of the mixture of long-chain fatty acids which constitutes the deinking agent.

There has been known in the art to use a fat and oil comprising higher fatty acids as a deinking agent. However, it has never been known heretofore that the aforesaid remarkable deinking effects can be achieved exclusively by using a mixture containing fatty acids of specific carbon atom numbers at a specific ratio as a raw material of the deinking agent. In the prior art, coconut oil and beef tallow are merely employed as such without paying any attention to the carbon atom number of the fatty acids. Thus there has never been disclosed in the prior art the use of a fat and oil comprising higher fatty acids at a specific ratio.

Although the use of fish oil fatty acids containing fatty acids having 20 or more carbon atoms as the constituent of the fat and oil is described in the prior arts, the effects achieved by using the deinking agent which is obtained from the fat and oil comprising fish oil fatty acids differ from those of the present invention. The effects that the excellent defoaming property of flotation reject is achieved and thus a deinked pulp with little contamination from the total remaining ink is produced are not suggested by the prior art.

In addition, the mixture of higher fatty acids (a) to be used in the present invention should have an iodine value (IV) below a specific level. In contrast, the fish oil fatty acids described in the prior arts have an iodine value (IV) of about 175. As will be clearly shown in the Comparative Examples given hereinafter, the deinking effects obtained by the present invention cannot be achieved by using the fish oil fatty acids of such a high iodine value (IV) as a raw material of the deinking agent.

In the present invention, the mixture (I) comprises a fat and oil (a) and/or a transesterification reaction mixture (B), and at least one mono- to tetradecahydric alcohol (C).

The transesterification reaction mixture (B) may be obtained by reacting the above-described fat and oil (a) with glycerol (b-2) at an appropriate ratio in the conventional manner.

Particular examples of mono- to tetradecahydric alcohol (C) include ethanol, 2-ethylhexanol, octanol, lauryl alcohol, stearyl alcohol, oleyl alcohol, cyclodecanol, ethylene glycol, propylene glycol, trimethylene glycol, butylene glycol, 1,6-hexane glycol, 2-ethylbutane-1,2,3-triol, glycerol, trimethylolpropane, trimethylolethane, 1,2,4-butanetriol, 1,2,6-hexanetriol, 1,1,1-trimethylolhexane, tetramethylolcyclohexanol, diglycerol, mannitol, pentaerythritol, erythritol, arabitol, sorbitol, D-glcyero-D-galactoheptose, D-glycero-D-glucoheptose, D-glycero-D-mannoheptose, D-glycero-L-mannoheptose, D-altro-heptulose, D-mannō-heptulose, D-altro-3-heptulose, D-glycero-D-galactoheptol, D-erythro-D-galactooctytol, D-glycero-D-mannooctulose, D-erythro-L-gulononulose, cellobiose, maltose, lactose, gentianose, cellotriose and stachyose. It is still preferable to use di- to hexahydric alcohols. In particular, glycerol is advantageous from an industrial viewpoint because it can also be used as glycerol (b-1) constituting the fat and oil (A) and glycerol (b-2) for transesterification reaction, and the addition of an alcohol is not necessary for preparing a deinking agent which exerts the aimed effects.

In the mixture (I), the molar ratio of the mono- to tetradecahydric alcohol (C) to glycerol (b) preferably ranges from 0.02/1 to 1/1. In the calculation of the molar ratio of this alcohol (C) to glycerol (b), the term "glycerol (b)" means the glycerol (b-1) bound to fatty acids and thus constituting the fat and oil (A) in the case that the fat and oil (A) is used, or, the total of glycerol (b-1) bound to fatty acids and thus constituting the fat and oil (A) and glycerol (b-2) which is used for transesterification in the case that the transesterification reaction mixture (B) is used.

The reaction mixture (II) as a deinking agent containing in the deinking composition of the present invention, which is obtained by using the mixture (I) wherein the molar ratio of alcohol (C) to glycerol (b) falls within the range as specified above, is effective in eliminating the total remaining ink and thus gives a deinked pulp which is little contaminated with unliberated ink, having a light color tone and, therefore, showing a high b value. When the molar ratio is out of the aforesaid range, however, the total remaining ink is observed to a small degree.

Examples of the alkylene oxide (D) to be added to the mixture (I) include ethylene oxide (hereinafter referred to simply as EO), propylene oxide (hereinafter referred to simply as PO) and butylene oxide (hereinafter referred to simply as BO). It is particularly preferable to add both of EO and PO. Although EO and PO may be added either in the form of a mixture (random addition) or successively (block addition), the random addition is preferable when taking into consideration of the reduction of foaming problems.

In the present invention, the addition of EO and PO may be effected by any common method without restriction. Namely, it may be carried out under the conditions commonly employed for adding an alkylene oxide to a compound having active hydrogen. Specifically, it may be performed as follows. A catalytic amount of an alkaline substance is added to a mixture (I) comprising the above-mentioned fat and oil (triglyceride) (A) and/or a transesterification reaction mixture (B), and at least one mono- to tetradecahydric alcohol (C). Then the obtained mixture is reacted with EO and PO at a temperature of from approximately 100° to 200° C. under a pressure of from 1 to 3 kg/cm$^2$ (gauge) for several hours.

It is preferable that the EO and PO are added at a molar ratio of EO to PO of 0.2 to 4, and that the molar number of EO addition is from 3 to 200 times as much as the average hydroxyl group number of the alcohol employed in the reaction, i.e., glycerol (b-2) and at least one mono- to tetradecahydric alcohol (C). When the EO to PO molar ratio and the molar number of EO addition are outside the above-mentioned ranges, the liberation of ink from waste papers tends to deteriorate. Furthermore the defoaming property of flotation reject in the flotation treatment or the ability to liberate ink in the washing treatment is deteriorated. On the other hand, a reaction mixture (II) satisfying these requirements is effective in reducing the unliberated ink. Therefore, it is preferable to use an alkylene oxide adduct, i.e. a reaction mixture (II), satisfying the above-mentioned requirements in order to obtain a deinked pulp which is little contaminated with the total remaining ink.

The reaction mixture (II) as a deinking agent in the present invention can exert satisfactory deinking effects even when used alone. Thus it is unnecessary to use other surfactants together with the reaction mixture (II). Therefore the present invention is highly useful from an industrial viewpoint, since it makes it possible not only to achieve an excellent deinking performance but also to simplify the process for producing or blending a deinking composition, thus enlarging the application range of the deinking agent and elevating the safety.

The deinking composition of the present invention is not particularly restricted, so long as it contains the above-mentioned reaction mixture (II) as an effective component. It may also contain other effective component(s) of known deinking compositions, for example, higher alcohol sulfates or half esters of higher alcohols with sulfuric acid (ROSO$_3$M), alkylbenzenesulfonates, ethylene oxide adducts of higher alcohols and alkylphenols, fatty acids and salts thereof, alkylene oxide adducts of fatty acids, alkylene oxide adducts of fats and oils, alkylene oxide adducts of monostearylglyceride and alkylene oxide adducts of polyhydric alcohol partial or complete ester. Deinking compositions thus obtained can also exert an excellent deinking performance. When the deinking composition of the present invention contains the reaction mixture (II) and the above-mentioned component(s) of known deinking compositions, the weight ratio of the reaction mixture (II)/the above-mentioned effective component(s) of known deinking compositions may range from 90/10 to 10/90, preferably from 60/40 to 20/80. The deinking composition which contains the reaction mixture (II) alone as the effective component may be use together with other deinking composition comprising other known deinking agent(s) as the effective component.

The deinking composition of the present invention may be added in any step to give a deinked pulp of improved qualities. In general, a deinking composition can be added in either one or both of the mixing step, which consists of pulping, kneading, dispersing, chemical mixing and refining steps, and the flotation step. When it is added in portions in each step of the mixing step, it may be added during the steps of pulping, kneading, dispersing, chemical mixing and refining. When it is added in portions in the pulping step (the preceding step) and any of the subsequent steps which are conducted after the pulping step, the weight ratio of the amount of the deinking composition to be added in the pulping step to that to be added in the subsequent step may preferably range from 10/90 to 90/10, still preferably from 40/60 to 60/40.

The deinking composition may be preferably added in such an amount that the operation characteristics are not deteriorated and the procedure may be effected economically. It is recommended to add the deinking composition such that the amount of the deinking agent as effective component, that is, the amount of the reaction mixture (II), is present in an amount from 0.03 to 1.0% by weight based on the weight of the waste papers to be deinked.

Although the working mechanism of the deinking composition and the deinking agent according to the present invention has not been clarified in detail, it is assumed to proceed as follows.

When the carbon atom number of the higher fatty acid constituting the fat and oil as a raw material is elevated, the adsorption of the deinking agent is oriented almost perpendicularly to the surface of a fine ink spot. As a result, the density of the terminal functional groups of the deinking agent on the surface of a fine ink spot is lowered. Thus the absolute surface charge density thereof per unit area is lowered, which might promote the aggregation of the fine ink spots, in accordance with the DLVO theory. When the content of higher fatty acids having 20 to 24 carbon atoms is less than 9.6% by weight, the fine ink spots exhibit little aggregation. When this content exceeds 70.6% by weight, on the other hand, a rapid decrease in the adsorption rate of the deinking agent onto the ink surface would make the control of the ink-surface charge density by the deinking agent insufficient. As a result, the fine ink spots would hardly aggregate. The aggregation of the fine ink spots elevates the absolute value of the surface charge density of the ink per se, thus lowering the re-adhesion of the ink to the pulp fibers.

When the content of the higher fatty acids having 20 to 24 carbon atoms in the mixture of higher fatty acids (a) ranges from 9.6 to 70.6% by weight, the fine ink spots readily aggregate and thus a deinked pulp which is little contaminated with the total remaining ink can be obtained.

On the other hand, the defoaming property of flotation reject can be improved by deteriorating the stability of the foam film. When the content of the higher fatty acids having 20 to 24 carbon atoms exceeds 70.6% by weight, the foam film is thickened and thus the foam is hardly broken. When the content of the higher fatty acids having 20 to 24 carbon atoms is lower than 9.6% by weight, the dense orientation of the deinking agent molecules makes foam breakage difficult.

Therefore, the content of the higher fatty acids having 20 to 24 carbon atoms in the mixture of higher fatty acids (a) should critically and advantageously range from 9.6 to 70.6% by weight in order to achieve a good defoaming property of the flotation reject and to reduce the total remaining ink.

When the iodine value of the mixture of higher fatty acids (a) is high, the deinking agent is adsorbed on the surface of the ink almost flatly to thereby form a thin adsorption layer (approximately 15 Å). Then, the effect of the surface potential ($\xi$-potential: $-30$ to $-40$ mV) of the ink per se becomes evident and thus the absolute value of the surface charge density per unit area is not lowered. As a result, the re-adhesion of the ink to pulp fibers is promoted and thus the total remaining ink increases.

Therefore a deinked pulp showing a good defoaming property of the flotation reject and little contamination with the total remaining ink can be obtained by using a compound, that is, the reaction mixture (II), satisfying the above-mentioned requirements as defined by the present invention.

EXAMPLES

To further illustrate the present invention in more detail, and not by way of limitation, the following Examples are given.

PRODUCTION EXAMPLE 1

225.2 g of a fat and oil which was constituted with the mixture of higher fatty acids described as A in Table 1 and glycerol, 7.4 g of glycerol and 2.3 g of 100% KOH were fed into a 3-l autoclave and heated to 160° C. while stirring at approximately 600 rpm. Next, the obtained mixture was reacted with 1476.7 g of a mixture of EO with PO (EO to PO molar ratio of 1/1) at a temperature of from 130° to 140° C. under a pressure of from 1 to 3 kg/cm$^2$ (gauge).

After the completion of the reaction, the reaction mixture was cooled to 75° C. and its pH value was adjusted to about 6 with acetic acid. The yield of the obtained reaction product (invention product No. 1 given in Table 3) was 99%.

PRODUCTION EXAMPLE 2

161.5 g of a fat and oil which was constituted with the mixture of higher fatty acids described as H in Table 1 and glycerol, 5.2 g of sorbitol and 1.6 g of 100% KOH were fed into a 10-l autoclave and heated to 160° C. while stirring at approximately 600 rpm. Next, the obtained mixture was reacted with 1691.9 g of EO in portions at a temperature of from 155° to 165° C. under a pressure of from 1 to 3 kg/cm$^2$ (gauge). After the completion of the EO addition, the reaction mixture was cooled to 120° to 130° C. and then reacted with 1113.6 g of PO under a pressure of 1 to 3 kg/cm$^2$ (gauge).

Then, the reaction mixture was cooled to 80° C. and its pH value was adjusted to about 6 with acetic acid. The yield of the obtained reaction product (invention product No. 44 given in Table 4) was 98.5%.

Tables 1 and 2 show the average carbon atom numbers, iodine values, fatty acid compositions (each column shows the total of saturated one and unsaturated one) and contents of higher fatty acids having 20 to 24 carbon atoms of fatty acid mixtures A to Z and a to w each constituting each fat and oil employed in the following Examples.

TABLE 1

| No. | Average C no. | IV | Fatty acid composition (wt. %) | | | | | | | | |
|---|---|---|---|---|---|---|---|---|---|---|---|
| | | | $C_8$ | $C_9$ | $C_{10}$ | $C_{11}$ | $C_{12}$ | $C_{13}$ | $C_{14}$ | $C_{15}$ | $C_{16}$ |

TABLE 1-continued

| | | | | | | | | | | | |
|---|---|---|---|---|---|---|---|---|---|---|---|
| A | 12.8 | 0.9 | 0.2 | 0.04 | 21.1 | 0.06 | 63.6 | 0.05 | 0.2 | 0.06 | 0.2 |
| B | 13.1 | 3.1 | 16.1 | 0.02 | 0.1 | 0.01 | 40.5 | 0.01 | 30.7 | 0 | 0.3 |
| C | 14.5 | 1.2 | 9.7 | 0.02 | 2.3 | 0.01 | 10.5 | 0.02 | 41.5 | 0.02 | 22.9 |
| D | 15.6 | 1.9 | 5.6 | 0.01 | 0.5 | 0.01 | 3.7 | 0.02 | 29.5 | 0.02 | 44.8 |
| E | 16.8 | 2.4 | 3.2 | 0 | 7.0 | 0 | 2.1 | 0 | 0.3 | 0 | 36.7 |
| F | 17.4 | 3.7 | 1.2 | 0 | 3.2 | 0 | 2.1 | 0 | 12.4 | 0 | 10.4 |
| G | 18.2 | 2.1 | 3.8 | 0 | 0 | 0 | 0.1 | 0 | 0.1 | 0 | 0.1 |
| H | 18.9 | 5.6 | 0.2 | 0 | 0.2 | 0 | 0.3 | 0 | 0.3 | 0 | 14.6 |
| I | 19.3 | 4.9 | 0.1 | 0 | 0.1 | 0 | 0.2 | 0 | 0.2 | 0 | 36.1 |
| J | 20.4 | 2.4 | 0 | 0 | 0 | 0 | 0.1 | 0 | 0.1 | 0 | 19.4 |
| K | 21.2 | 8.0 | 0 | 0 | 0 | 0 | 0 | 0 | 0.1 | 0 | 2.9 |
| L | 22.3 | 6.6 | 0 | 0 | 0 | 0 | 0 | 0 | 0 | 0 | 0 |
| M | 12.8 | 1.9 | 0.2 | 0.04 | 21.1 | 0.06 | 63.6 | 0.05 | 0.2 | 0.06 | 0.2 |
| N | 14.5 | 9.3 | 9.7 | 0.02 | 2.3 | 0.01 | 10.5 | 0.02 | 41.5 | 0.02 | 22.9 |
| O | 15.6 | 23.9 | 5.6 | 0.01 | 0.5 | 0.01 | 3.7 | 0.02 | 29.6 | 0.02 | 44.8 |
| P | 16.8 | 39.6 | 3.2 | 0 | 7.0 | 0 | 2.1 | 0 | 0.3 | 0 | 36.7 |
| Q | 18.9 | 69.4 | 0.2 | 0 | 0.2 | 0 | 0.3 | 0 | 0.3 | 0 | 14.6 |
| R | 20.4 | 56.5 | 0 | 0 | 0 | 0 | 0.1 | 0 | 0.1 | 0 | 19.4 |
| S | 22.3 | 8.1 | 0 | 0 | 0 | 0 | 0 | 0 | 0 | 0 | 0 |
| T | 18.5 | 1.3 | 0 | 0 | 0 | 0 | 0 | 0 | 1.9 | 0 | 36.9 |
| U | 18.5 | 1.3 | 0 | 0 | 0 | 0 | 0 | 0 | 6.5 | 0 | 25.0 |
| V | 19.0 | 1.3 | 0 | 0 | 0 | 0 | 0 | 0 | 6.9 | 0 | 19.0 |
| W | 18.8 | 1.3 | 0 | 0 | 0 | 0 | 0 | 0 | 6.0 | 0 | 22.7 |
| X | 18.5 | 1.3 | 0 | 0 | 0 | 0 | 0 | 0 | 4.2 | 0 | 31.0 |
| Y | 18.5 | 43.5 | 0 | 0 | 0 | 0 | 0 | 0 | 1.9 | 0 | 36.9 |
| Z | 18.5 | 69.8 | 0 | 0 | 0 | 0 | 0 | 0 | 1.9 | 0 | 36.9 |

| | Fatty acid composition (wt. %) | | | | | | | | Content of $C_{20}$-$C_{24}$ fatty acids |
|---|---|---|---|---|---|---|---|---|---|
| No. | $C_{17}$ | $C_{18}$ | $C_{19}$ | $C_{20}$ | $C_{21}$ | $C_{22}$ | $C_{23}$ | $C_{24}$ | (wt. %) |
| A | 0.04 | 3.8 | 0.05 | 4.5 | 0.05 | 5.9 | 0.05 | 0.1 | 9.6 |
| B | 0.01 | 0.4 | 0.05 | 4.7 | 0.05 | 6.9 | 0.05 | 0.1 | 11.8 |
| C | 0.01 | 0.5 | 0.02 | 4.8 | 0.05 | 7.5 | 0.05 | 0.1 | 12.5 |
| D | 0.01 | 0.6 | 0.03 | 5.1 | 0.05 | 9.8 | 0.05 | 0.1 | 12.8 |
| E | 0.06 | 34.1 | 0.04 | 5.6 | 0.05 | 10.7 | 0.05 | 0.1 | 16.5 |
| F | 0.04 | 52.8 | 0.06 | 5.8 | 0.05 | 11.4 | 0.05 | 0.5 | 17.8 |
| G | 0.07 | 74.5 | 0.03 | 5.3 | 0.05 | 13.4 | 0.05 | 1.1 | 30.5 |
| H | 0.05 | 47.0 | 0.05 | 15.4 | 0.05 | 18.1 | 0.05 | 3.7 | 37.3 |
| I | 0 | 9.2 | 0.1 | 16.5 | 0.1 | 26.9 | 0.1 | 10.4 | 54.0 |
| J | 0 | 17.6 | 0 | 17.9 | 0.1 | 21.2 | 0.1 | 23.5 | 62.8 |
| K | 0 | 32.9 | 0 | 4.2 | 0.1 | 20.6 | 0.1 | 39.1 | 64.1 |
| L | 0 | 18.4 | 11.6 | 0.2 | 0.1 | 0.2 | 0.1 | 69.4 | 70.0 |
| M | 0.04 | 3.5 | 0.05 | 4.5 | 0.05 | 6.2 | 0.05 | 0.1 | 10.9 |
| N | 0.01 | 0.5 | 0.02 | 4.8 | 0.05 | 7.5 | 0.05 | 0.1 | 12.5 |
| O | 0.01 | 0.6 | 0.03 | 5.1 | 0.05 | 9.8 | 0.05 | 0.1 | 12.8 |
| P | 0.06 | 34.1 | 0.04 | 5.6 | 0.05 | 10.7 | 0.05 | 0.1 | 16.5 |
| Q | 0.05 | 47.0 | 0.05 | 15.4 | 0.05 | 18.1 | 0.05 | 3.7 | 37.3 |
| R | 0 | 17.6 | 0 | 17.9 | 0.1 | 21.2 | 0.1 | 23.5 | 62.8 |
| S | 0 | 18.4 | 11.6 | 0.2 | 0.1 | 0.2 | 0.1 | 69.4 | 70.0 |
| T | 0 | 19.5 | 0 | 17.8 | 0 | 23.9 | 0 | 0 | 41.7 |
| U | 0 | 27.6 | 0 | 20.2 | 0 | 19.1 | 0 | 1.6 | 40.9 |
| V | 0 | 23.0 | 0 | 22.7 | 0 | 27.5 | 0 | 0.9 | 51.1 |
| W | 0 | 23.8 | 0 | 20.8 | 0 | 26.7 | 0 | 0 | 47.5 |
| X | 0 | 23.6 | 0 | 19.0 | 0 | 21.5 | 0 | 0 | 41.3 |
| Y | 0 | 19.5 | 0 | 17.8 | 0 | 23.9 | 0 | 0 | 41.7 |
| Z | 0 | 19.5 | 0 | 17.8 | 0 | 23.9 | 0 | 0 | 41.7 |

*T, U, V and W are mixtures of fatty acids each constituting cod oil, sardine oil, saury oil and mackerel oil.
X is a blend of T and U at a weight rate of 50/50.
Y and Z are ones obtained by varying the iodine value (IV) of T.

TABLE 2

| | Average | | Fatty acid composition (wt. %) | | | | | | | | |
|---|---|---|---|---|---|---|---|---|---|---|---|
| No. | C no. | IV | $C_8$ | $C_9$ | $C_{10}$ | $C_{11}$ | $C_{12}$ | $C_{13}$ | $C_{14}$ | $C_{15}$ | $C_{16}$ |
| a | 9.7 | 2.3 | 89.1 | 0 | 0 | 0 | 0 | 0 | 0 | 0 | 0 |
| b | 10.4 | 3.6 | 34.4 | 0.04 | 45.9 | 0.06 | 8.9 | 0.04 | 3.2 | 0.02 | 1.8 |
| c | 12.5 | 2.1 | 0.2 | 0.05 | 33.5 | 0.05 | 51.5 | 0.02 | 0.3 | 0.04 | 0.3 |
| d | 12.8 | 4.8 | 1.1 | 0.04 | 9.1 | 0.06 | 76.8 | 0.04 | 2.6 | 0.02 | 2.1 |
| e | 13.2 | 7.7 | 16.0 | 0.02 | 0.1 | 0.01 | 27.7 | 0.04 | 45.7 | 0.01 | 0.4 |
| f | 17.3 | 85.2 | 1.2 | 0 | 3.3 | 0 | 2.1 | 0 | 12.6 | 0 | 11.2 |
| g | 18.0 | 1.9 | 0 | 0 | 0 | 0 | 0 | 0 | 0 | 0 | 0 |
| h | 19.4 | 3.6 | 0 | 0 | 0.5 | 0 | 0.8 | 0 | 15.7 | 0 | 12.0 |
| i | 22.4 | 6.1 | 0 | 0 | 0 | 0 | 0 | 0 | 0 | 0 | 0 |
| j | 23.9 | 9.5 | 0 | 0 | 0 | 0 | 0 | 0 | 0 | 0 | 0 |
| k | 24.0 | 8.8 | 0 | 0 | 0 | 0 | 0 | 0 | 0 | 0 | 0 |
| l | 12.8 | 71.0 | 0.2 | 0.04 | 21.1 | 0.06 | 63.6 | 0.05 | 0.2 | 0.06 | 0.2 |
| m | 14.5 | 85.2 | 9.7 | 0.02 | 2.3 | 0.01 | 10.5 | 0.02 | 41.5 | 0.02 | 22.9 |
| n | 15.6 | 92.1 | 5.6 | 0.01 | 0.5 | 0.01 | 3.7 | 0.02 | 29.6 | 0.02 | 44.8 |
| o | 16.8 | 118.4 | 3.2 | 0 | 7.0 | 0 | 2.1 | 0 | 0.3 | 0 | 36.7 |
| p | 18.9 | 138.1 | 0.2 | 0 | 0.2 | 0 | 0.3 | 0 | 0.3 | 0 | 14.6 |

TABLE 2-continued

| | | | | | | | | | | | |
|---|---|---|---|---|---|---|---|---|---|---|---|
| q | 20.4 | 171.3 | 0 | 0 | 0 | 0 | 0.1 | 0 | 0.1 | 0 | 19.4 |
| r | 18.5 | 77.5 | 0 | 0 | 0 | 0 | 0 | 0 | 1.9 | 0 | 36.9 |
| s | 18.0 | 1.3 | 0 | 0 | 0 | 0 | 0 | 0 | 0 | 0 | 0 |
| t | 14.0 | 1.3 | 0 | 0 | 0 | 0 | 0 | 0 | 100 | 0 | 0 |
| u | 17.8 | 1.3 | 0 | 0 | 0 | 0 | 0 | 0 | 0 | 0 | 8.0 |
| v | 16.5 | 1.3 | 0 | 0 | 0 | 0 | 0.2 | 0.1 | 29.3 | 0.1 | 6.2 |
| w | 18.5 | 175.0 | 0 | 0 | 0 | 0 | 0 | 0 | 6.5 | 0 | 25.0 |

| No. | Fatty acid composition (wt. %) | | | | | | | | Content of $C_{20}$–$C_{24}$ fatty acids (wt. %) |
|---|---|---|---|---|---|---|---|---|---|
| | $C_{17}$ | $C_{18}$ | $C_{19}$ | $C_{20}$ | $C_{21}$ | $C_{22}$ | $C_{23}$ | $C_{24}$ | |
| a | 0 | 0 | 0 | 0 | 0 | 0 | 0 | 10.9 | 10.9 |
| b | 0.02 | 0.7 | 0.02 | 1.9 | 0 | 3.4 | 0 | 0.1 | 5.4 |
| c | 0.01 | 3.4 | 0.03 | 4.3 | 0.05 | 6.1 | 0.05 | 0.1 | 10.6 |
| d | 0.03 | 1.4 | 0.01 | 0 | 0 | 0 | 0 | 6.7 | 6.7 |
| e | 0.02 | 0.5 | 0 | 3.5 | 0.05 | 5.8 | 0.05 | 0.1 | 9.5 |
| f | 0.05 | 59.7 | 0.05 | 0.1 | 0 | 2.3 | 0 | 7.4 | 9.8 |
| g | 0 | 100 | 0 | 0 | 0 | 0 | 0 | 0 | 0 |
| h | 0 | 0.2 | 0.1 | 27.4 | 0.05 | 35.4 | 0.05 | 5.8 | 70.7 |
| i | 0 | 0 | 0 | 0 | 0 | 86.7 | 0 | 13.3 | 100 |
| j | 0 | 1.1 | 0 | 0.3 | 0.05 | 0.4 | 0.05 | 98.1 | 98.9 |
| k | 0 | 0 | 0 | 0 | 0 | 0 | 0 | 100 | 100 |
| l | 0.04 | 3.5 | 0.05 | 4.5 | 0.05 | 6.2 | 0.05 | 0.1 | 10.9 |
| m | 0.01 | 0.5 | 0.02 | 4.8 | 0.05 | 7.5 | 0.05 | 0.1 | 12.5 |
| n | 0.01 | 0.6 | 0.03 | 5.1 | 0.05 | 9.8 | 0.05 | 0.1 | 12.8 |
| o | 0.06 | 34.1 | 0.04 | 5.6 | 0.05 | 10.7 | 0.05 | 0.1 | 16.5 |
| p | 0.05 | 47.0 | 0.05 | 15.4 | 0.05 | 18.1 | 0.05 | 3.7 | 37.3 |
| q | 0 | 17.6 | 0 | 17.9 | 0.1 | 21.2 | 0.1 | 23.5 | 62.8 |
| r | 0 | 19.5 | 0 | 17.8 | 0 | 23.9 | 0 | 0 | 41.7 |
| s | 0 | 100 | 0 | 0 | 0 | 0 | 0 | 0 | 0 |
| t | 0 | 0 | 0 | 0 | 0 | 0 | 0 | 0 | 0 |
| u | 0 | 92.0 | 0 | 0 | 0 | 0 | 0 | 0 | 0 |
| v | 0.1 | 63.8 | 0.1 | 0.1 | 0 | 0 | 0 | 0 | 0.1 |
| w | 0 | 27.6 | 0 | 20.2 | 0 | 19.1 | 0 | 1.6 | 40.9 |

*r is one obtained by varying the iodine value (IV) of T.
s, t and u are respectively stearic acid, myristic acid and marketed stearic acid.
v is beef tallow fatty acid, and the fat and oil corresponding to v herein is hardened beef tallow.
w is a mixture of fatty acids constituting sardine oil [iodine value (IV) : 175.0].

EXAMPLE 1

In this Example, a deinking composition consisting essentially of a deinking agent was added at once in the pulping step.

Collected waste newspapers were cut into pieces (2×5 cm). A given amount thereof was fed into a bench disintegrator. Then, an appropriate amount of water, 0.8% by weight (based on the collected waste newspapers used) of caustic soda, 2.2% by weight (based on the collected waste newspapers used) of sodium silicate No. 3, 3.5% by weight (based on the collected waste newspapers used) of hydrogen peroxide aq. soln. (30% by weight) and 0.3% by weight (based on the collected waste newspapers used) of each deinking composition listed in Table 3 were added thereto. After disintegrating at a pulp concentration of 15% by weight at 45° C. for 12 minutes, the mixture was aged at 55° C. for 120 minutes. Next, the obtained pulp slurry was dehydrated on a high-speed dehydrator until the pulp concentration reached 23% by weight and then kneaded on a twin-screw laboratory kneader at 300 rpm. After diluting with water so as to give a pulp concentration of 4% by weight, it was disintegrated again on the bench disintegrator for 30 seconds. The obtained slurry was diluted with water so as to give a pulp concentration of 1% by weight and then subjected to flotation at 30° C. for 10 minutes by using a laboratory flotator. During flotation, the defoaming property of the flotation reject was measured. After the completion of the flotation, the pulp slurry was concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The hardness of the water employed above was 5° dH. The hardness was adjusted with the use of $CaCl_2$ and $MgCl_2$ at a molar ratio of Ca:Mg being 8:2.

The total ink spots remaining in the obtained pulp sheet were counted with an image analyzer (100×magnification).

The defoaming property of the flotation reject was measured as follows. The foam scraped out from the laboratory flotator at 3 minutes after the beginning of the flotation was introduced into a 2-l cylinder. Then the foam volume immediately after the introduction ($H_0$) and that 1 minute after the introduction ($H_1$) were measured. The foam breakage was calculated in accordance with the following formula.

$$\text{foam breakage } (\%) = (H_0 - H_1)/H_0 \times 100$$

A smaller $H_0$ and $H_1$, and a larger foam breakage mean a better defoaming property.

Table 3 shows the deinking agents (i.e., deinking compositions herein) [Descriptions of raw materials for each deinking agent, i.e., kinds of a fat and oil, an alcohol and alkylene oxide(s) used, the fat and oil to alcohol molar ratio (i.e., glycerol constituting a fat and oil to alcohol molar ratio), total AO to the fat and oil molar ratio, and the total molecular weight of each deinking agent are included.] used, the deinking performances thereof and defoaming properties thereof.

The total molecular weight was measured as follows. A deinking agent sample was diluted with tetrahydrofuran so as to give a concentration of 0.5% by weight, and the obtained sample was analyzed by gel permeation chromatography with the use of a polystyrene column and then calculated the total molecular weight based on the molecular weight of polystyrene.

for 120 minutes. Next, the obtained pulp slurry was dehydrated on a high-speed dehydrator until the pulp concentration reached 23% by weight. After adding

TABLE 3

| No. | Fat and Oil (α)*1 | Alcohol (β) | α/β mol. ratio | AO*2 (mol. ratio) | AO/α mol. ratio | Total M.W. | Deinking Performance Total remaining ink spots | Defoaming Property Foam Vol. (ml) $H_0$ | Defoaming Property Foam Vol. (ml) $H_1$ | (%) Foam breakage |
|---|---|---|---|---|---|---|---|---|---|---|
| Invention products | | | | | | | | | | |
| 1 | A | glycerol | 1/0.3 | EO/PO (1.0/1.0) | 108 | 6380 | 41 | 285 | 80 | 71.9 |
| 2 | B | octanol | 1/0.02 | EO/PO (2.0/1.0) | 28.5 | 2230 | 39 | 305 | 90 | 70.5 |
| 3 | C | ethylene glycol | 1/0.05 | EO/PO (3.0/1.0) | 52 | 3250 | 44 | 345 | 100 | 71.0 |
| 4 | D | trimethylolpropane | 1/0.07 | EO/PO (1.5/1.0) | 112 | 6380 | 46 | 290 | 85 | 70.7 |
| 5 | E | diglycerol | 1/0.1 | EO/PO (1.7/1.0) | 144.5 | 7960 | 49 | 290 | 90 | 69.0 |
| 6 | F | erythritol | 1/0.2 | EO | 102 | 5350 | 52 | 390 | 135 | 65.4 |
| 7 | G | D-glycero-D-galacto-heptose | 1/0.4 | PO | 36 | 3440 | 51 | 315 | 100 | 68.3 |
| 8 | H | D-altro-3-heptulose | 1/0.5 | EO | 98 | 5710 | 59 | 395 | 140 | 64.6 |
| 9 | I | D-erythro-D-galacto-octitol | 1/0.6 | PO | 195 | 12900 | 57 | 320 | 105 | 67.2 |
| 10 | J | lactose | 1/0.7 | BO | 122 | 10640 | 61 | 335 | 115 | 65.7 |
| 11 | K | gentianose | 1/0.8 | EO/PO (0.2/1.0) | 1488 | 84900 | 53 | 245 | 65 | 73.5 |
| 12 | L | cellotriose | 1/0.9 | EO/PO (3.5/1.0) | 254.5 | 14500 | 53 | 350 | 120 | 65.7 |
| 13 | M | stachyose | 1/1 | EO/PO (4.0/1.0) | 314 | 17700 | 51 | 340 | 115 | 65.2 |
| 14 | A | pentaerythritol | 1/0.3 | EO/PO (2.5/1.0) | 119 | 12200 | 43 | 310 | 95 | 69.4 |
| 15 | A | sorbitol | 1/0.3 | EO/PO (2.0/1.0) | 108 | 6150 | 41 | 295 | 80 | 72.9 |

*1 A symbol which means a mixture of fatty acids constituting a fat and oil is described.
*2 Alkylene oxides were added by random addition except for Nos. 6 to 10.

| No. | Fat and Oil (α)*1 | Alcohol (β) | α/β mol. ratio | AO*2 (mol. ratio) | AO/α mol. ratio | Total M.W. | Deinking Performance Total remaining ink spots | $H_0$ | $H_1$ | (%) Foam breakage |
|---|---|---|---|---|---|---|---|---|---|---|
| 16 | H | ethylene glycol | 1/0.01 | EO/PO (2.0/1.5) | 87.5 | 5220 | 75 | 280 | 80 | 71.4 |
| 17 | H | ethylene glycol | 1/0.5 | EO/PO (2.0/1.5) | 87.5 | 5250 | 40 | 295 | 90 | 69.5 |
| 18 | H | ethylene glycol | 1/2 | EO/PO (2.0/1.5) | 87.5 | 5280 | 76 | 305 | 100 | 67.2 |
| Comparative products | | | | | | | | | | |
| 19 | a | glycerol | 1/0.3 | EO/PO (1.0/1.0) | 108 | 6380 | 125 | 690 | 340 | 50.7 |
| 20 | b | octanol | 1/0.02 | EO/PO (2.0/1.0) | 28.5 | 2230 | 126 | 720 | 365 | 49.3 |
| 21 | c | ethylene glycol | 1/0.05 | EO/PO (3.0/1.0) | 50.5 | 3250 | 131 | 740 | 380 | 48.6 |
| 22 | d | trimethylolpropane | 1/0.07 | EO/PO (1.5/1.0) | 111.5 | 6380 | 135 | 715 | 365 | 49.0 |
| 23 | e | diglycerol | 1/0.1 | EO/PO (1.7/1.0) | 144.5 | 7960 | 132 | 725 | 385 | 46.9 |
| 24 | f | erythritol | 1/0.2 | EO | 102 | 5350 | 141 | 765 | 430 | 43.8 |
| 25 | g | D-glycero-D-galacto-heptose | 1/0.4 | PO | 36 | 3440 | 140 | 745 | 395 | 47.0 |
| 26 | h | D-altro-3-heptulose | 1/0.5 | EO | 98 | 5710 | 143 | 770 | 440 | 42.9 |
| 27 | i | D-erythro-D-galacto-octitol | 1/0.6 | PO | 195 | 12900 | 145 | 730 | 385 | 47.3 |
| 28 | j | lactose | 1/0.7 | EO/PO (1.0/1.0) | 244 | 14300 | 139 | 725 | 385 | 46.9 |
| 29 | k | gentianose | 1/0.8 | EO/PO (0.2/1.0) | 1488 | 84900 | 136 | 680 | 330 | 51.5 |
| 30 | l | cellotriose | 1/0.9 | EO/PO (3.5/1.0) | 254.5 | 14500 | 129 | 720 | 395 | 45.1 |

*1 A symbol which means a mixture of fatty acids constituting a fat and oil is described.
*2 Alkylene oxides were added by random addition except for Nos. 24 to 27.

| No. | Fat and Oil | Alcohol (β) | α/β mol. ratio | AO*2 (mol. ratio) | AO/α mol. ratio | Total M.W. | Deinking Performance Total remaining ink spots | $H_0$ | $H_1$ | (%) Foam breakage |
|---|---|---|---|---|---|---|---|---|---|---|
| 31 | m | stachyose | 1/1 | EO/PO (4.0/1.0) | 314 | 17700 | 130 | 715 | 405 | 43.4 |
| 32 | a | pentaerythritol | 1/0.3 | EO/PO (2.2/1.0) | 110.5 | 6220 | 127 | 720 | 390 | 45.8 |
| 33 | a | sorbitol | 1/0.3 | EO/PO (1.4/1.0) | 101 | 5930 | 134 | 730 | 400 | 45.2 |
| 34 | beef tallow | glycerol | 1/0.3 | EO/PO (1.0/1.0) | 108 | 6380 | 152 | 815 | 470 | 42.3 |
| 35 | beef tallow | glycerol | 1/0.3 | EO/PO (2.0/1.0) | 81 | 4800 | 156 | 820 | 475 | 42.1 |
| 36 | beef tallow | diglycerol | 1/0.02 | EO/PO (0.1/1.0) | 242 | 14600 | 155 | 805 | 470 | 41.6 |
| 37 | coconut oil | nonanol | 1/0.15 | EO/PO (0.8/1.0) | 25 | 2040 | 159 | 810 | 465 | 42.6 |
| 38 | coconut oil | diethylene glycol | 1/0.1 | EO/PO (1.2/1.0) | 64 | 3980 | 162 | 835 | 485 | 41.9 |
| 39 | coconut oil | glycerol | 1/0.01 | EO/PO (1.9/1.0) | 296 | 15200 | 161 | 830 | 480 | 42.2 |
| 40 | bone oil | trimethylolpropane | 1/1.1 | EO/PO (2.6/1.0) | 205 | 10800 | 157 | 845 | 495 | 41.4 |
| 41 | bone oil | erythritol | 1/0.6 | EO/PO (4.1/1.0) | 81 | 4690 | 153 | 840 | 495 | 41.1 |

*1 A symbol which means a mixture of fatty acids constituting a fat and oil (in Nos. 31 to 33) or a name of a fat and oil (in Nos. 34 to 41) is described.
*2 Alkylene oxides were added by random addition.

EXAMPLE 2

In this Example, a deinking composition consisting essentially of a deinking agent was added in portions in the pulping step and in the chemical mixing step.

Collected waste newspapers were cut into pieces (2×5 cm). A given amount thereof was fed into a bench disintegrator. Then, an appropriate amount of water, 0.2% by weight (based on the collected waste newspapers used) of caustic soda and 0.1% by weight (based on the collected waste newspapers used) of each deinking composition listed in Table 4 were added thereto. After disintegrating at a pulp concentration of 15% by weight at 45° C. for 12 minutes, the mixture was aged at 55° C. 0.6% by weight (based on the collected waste newspapers used) of caustic soda, 2.2% by weight (based on the collected waste newspapers used) of sodium silicate No. 3, 3.5% by weight (based on the collected waste newspapers used) of hydrogen peroxide aq. soln. (30% by weight) and 0.2% by weight (based on the collected waste newspapers used) of each deinking composition listed in Table 4, the mixture was diluted with water so as to give a pulp concentration of 22% by weight and mixed on the bench disintegrator for 1 minute. Then, it was kneaded on a twin-screw laboratory kneader at 300 rpm. After diluting with water so as to give a pulp concentration of 4% by weight, it was disintegrated again on the bench disintegrator for 30 seconds. The obtained pulp slurry was diluted with water so as to give a pulp concentration of 1% by weight and then subjected to flotation at 30° C. for 10 minutes. The defoaming property of the flotation reject was measured as described in Example 1. After the completion of the flotation, the pulp slurry was concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The hardness of the water employed above was 5° dH. The hardness was adjusted with the use of CaCl₂ and MgCl₂ at a molar ratio of Ca:Mg being 8:2.

The total ink spots remaining in the obtained pulp sheet were counted with an image analyzer (100×magnification).

Table 4 shows the deinking agents (i.e., deinking compositions herein) used, the deinking performances thereof and defoaming properties thereof.

EXAMPLE 3

In this Example, a deinking composition consisting essentially of a deinking agent was added in portions in the pulping step and in the kneading step.

Collected waste newspapers were cut into pieces (2×5 cm). A given amount thereof was fed into a bench disintegrator. Then, an appropriate amount of water, 0.2% by weight (based on the collected waste newspapers used) of caustic soda and 0.1% by weight (based on the collected waste newspapers used) of each deinking composition listed in Table 5 were added thereto. After disintegrating at a pulp concentration of 15% by weight at 45° C. for 12 minutes, the mixture was aged at 55° C. for 120 minutes. Next, the obtained pulp slurry was dehydrated on a high-speed dehydrator until the pulp concentration reached 22% by weight. After adding 0.6% by weight (based on the collected waste newspapers used) of caustic soda, 2.2% by weight (based on the collected waste newspapers used) of sodium silicate No. 3, 3.5% by weight (based on the collected waste newspapers used) of hydrogen peroxide aq. soln. (30% by weight) and 0.2% by weight (based on the collected waste newspapers used) of each deinking composition listed in Table 5, the mixture was diluted with water so

TABLE 4

| No. | Fat and Oil (α)*1 | Alcohol (β) | α/β mol. ratio | AO*2 (mol. ratio) | AO/α mol. ratio | Total M.W. | Deinking Performance Total remaining ink spots | Defoaming Property Foam Vol. (ml) H₀ | H₁ | (%) Foam break-age |
|---|---|---|---|---|---|---|---|---|---|---|
| Invention products | | | | | | | | | | |
| 42 | A | lauryl alcohol | 1/0.02 | EO/PO (10/1.0) | 47.3 | 2990 | 79 | 305 | 105 | 65.6 |
| 43 | B | propylene glycol | 1/1 | EO/PO (5.0/1.0) | 61 | 13000 | 75 | 310 | 150 | 51.6 |
| 44 | H | sorbitol | 1/0.15 | EO/PO (2.0/1.0) | 300 | 15500 | 46 | 310 | 105 | 66.1 |
| 45 | N | trimethylolethane | 1/0.3 | EO/PO (2.5/1.0) | 102 | 5780 | 40 | 315 | 105 | 66.7 |
| 46 | O | 1,2,4-butanetriol | 1/0.5 | EO/PO (3.0/1.0) | 112 | 6210 | 47 | 345 | 115 | 66.7 |
| 47 | P | tetramethylolcyclohexanol | 1/0.5 | EO/PO (3.5/1.0) | 123.5 | 6730 | 48 | 370 | 125 | 66.2 |
| 48 | Q | mannitol | 1/0.7 | EO/PO (4.0/1.0) | 137.5 | 7400 | 54 | 405 | 140 | 65.4 |
| 49 | R | arabitol | 1/0.7 | EO/PO (0.5/1.0) | 375 | 21000 | 55 | 270 | 80 | 70.4 |
| 50 | S | maltose | 1/1 | EO/PO (0.7/1.0) | 340 | 13200 | 55 | 285 | 90 | 68.4 |
| 51 | F | glycerol | 1/0.03 | EO/PO (2.0/1.0) | 101 | 5770 | 43 | 340 | 105 | 69.1 |
| 52 | F | glycerol | 1/0.3 | EO/PO (2.0/1.0) | 101 | 5790 | 39 | 380 | 120 | 68.4 |
| 53 | F | glycerol | 1/0.9 | EO/PO (2.0/1.0) | 101 | 5850 | 46 | 395 | 130 | 67.1 |
| Comparative products | | | | | | | | | | |
| 54 | a | lauryl alcohol | 1/0.02 | EO/PO (1.0/1.0) | 86 | 5230 | 132 | 755 | 430 | 43.0 |
| 55 | b | propylene glycol | 1/1 | EO/PO (1.5/1.0) | 85 | 5190 | 129 | 790 | 450 | 43.0 |
| 56 | n | trimethylolethane | 1/0.3 | EO/PO (2.0/1.0) | 109.5 | 5780 | 136 | 775 | 450 | 41.9 |
| 57 | o | 1,2,4-butanetriol | 1/0.5 | EO/PO (3.0/1.0) | 112 | 6210 | 139 | 795 | 465 | 41.5 |
| 58 | p | tetramethylolcyclohexanol | 1/0.5 | EO/PO (3.5/1.0) | 123.5 | 6730 | 144 | 800 | 470 | 41.3 |
| 59 | q | mannitan | 1/0.7 | EO/PO (4.0/1.0) | 12.5 | 1550 | 135 | 810 | 475 | 41.4 |
| 60 | r | arabitol | 1/0.7 | EO/PO (0.5/1.0) | 375 | 21000 | 141 | 705 | 395 | 44.0 |
| 61 | palm oil | glycerol | 1/0.03 | EO/PO (2.0/1.0) | 907.5 | 44900 | 167 | 840 | 510 | 39.3 |
| 62 | hardened beef tallow (IV = 1.1) | butylene glycol | 1/0.5 | EO/PO (1.0/1.0) | 148 | 8430 | 152 | 855 | 515 | 39.8 |
| 63 | hardened bone oil (IV = 1.3) | sorbitol | 1/0.15 | EO/PO (2.0/1.0) | 300 | 15500 | 163 | 835 | 510 | 38.9 |
| 65 | — | ethylene glycol | — | EO/PO (1.5/1.0) | 83.5 | 4260 | 315 | 965 | 590 | 38.9 |
| 66 | — | trimethylolpropane | — | EO/PO (1.5/1.0) | 83.5 | 4320 | 324 | 970 | 600 | 38.1 |
| 67 | palm oil | glycerol | 1/0.3 | EO/PO (2.0/1.0) | 102 | 5820 | 154 | 885 | 545 | 38.4 |
| 68 | palm oil | glycerol | 1/0.9 | EO/PO (2.0/1.0) | 102 | 5880 | 162 | 895 | 555 | 38.0 |
| 69 | sodium dodecylbenzenesulfonate | | | | | | 188 | 890 | 550 | 38.2 |
| 70 | nonylphenol (EO)₂₀(PO)₁₀ | | | | | | 190 | 870 | 540 | 37.9 |
| 71 | stearyl alcohol (EO)₃₂(PO)₃₂ | | | | | | 193 | 895 | 555 | 38.0 |

*1 A symbol which means a mixture of fatty acids constituting a fat and oil (in Nos. 57 to 60) or a name of a fat and oil (in Nos. 61 to 64, 67 and 68) is described.
*2 Alkylene oxides were added by block addition.

as to give a pulp concentration of 23% by weight and mixed on the bench disintegrator for 1 minute. Then, it was kneaded on a twin-screw laboratory kneader at 330 rpm. After diluting with water so as to give a pulp concentration of 4% by weight, it was disintegrated again on the bench disintegrator for 30 seconds. The obtained pulp slurry was diluted with water so as to give a pulp concentration of 1% by weight and then subjected to flotation at 30° C. for 10 minutes. The defoaming property of the flotation reject was measured as described in Example 1. After the completion of the flotation, the pulp slurry was concentrated on an 80-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The hardness of the water employed above was 10° dH. The hardness was adjusted with the use of $CaCl_2$ and $MgCl_2$ at a molar ratio of Ca:Mg being 8:2.

The total ink spots remaining in the obtained pulp sheet were counted with an image analyzer (100×magnification).

Table 5 shows the deinking agents (i.e., deinking compositions herein) used, the deinking performances thereof and defoaming properties thereof.

the collected waste newspapers used) of each deinking composition listed in Table 6 were added thereto. After disintegrating at a pulp concentration of 15% by weight at 45° C. for 12 minutes, the mixture was aged at 55° C. for 120 minutes. Next, the obtained pulp slurry was dehydrated on a high-speed dehydrator until the pulp concentration reached 22% by weight. After adding 0.6% by weight (based on the collected waste newspapers used) of caustic soda, 2.2% by weight (based on the collected waste newspapers used) of sodium silicate No. 3 and 3.5% by weight (based on the collected waste newspapers used) of hydrogen peroxide aq. soln. (30% by weight), the mixture was diluted with water so as to give a pulp concentration of 23% by weight and mixed on the bench disintegrator for 1 minute. Then, it was kneaded on a twin-screw laboratory kneader at 300 rpm. After diluting with water so as to give a pulp concentration of 4% by weight, it was disintegrated again on the bench disintegrator for 30 seconds. After adding 0.2% by weight (based on the collected waste newspapers used) of each deinking composition listed in Table 6, the mixture was diluted with water so as to give a pulp concentration of 1% by weight, and then it was subjected to flotation at 30° C. for 10 minutes. The defoaming property of the flotation reject was measured as described in Example 1. After the completion

TABLE 5

| No. | Fat and Oil (α)*1 | Alcohol (β) | α/β mol. ratio | AO*2 (mol. ratio) | AO/α mol. ratio | Total M.W. | Deinking Performance Total remaining ink spots | Foam Vol. (ml) $H_0$ | Foam Vol. (ml) $H_1$ | (%) Foam breakage |
|---|---|---|---|---|---|---|---|---|---|---|
| Invention products | | | | | | | | | | |
| 72 | T | glycerol | 1/0.2 | EO/PO (2.0/1.0) | 93 | 5380 | 38 | 275 | 75 | 72.7 |
| 73 | U | sorbitol | 1/0.15 | EO/PO (1.0/1.0) | 70 | 4440 | 43 | 295 | 85 | 71.2 |
| 74 | V | cyclodecanol | 1/1 | EO/PO (1.0/1.0) | 52 | 3640 | 47 | 340 | 100 | 70.6 |
| 75 | W | butylene glycol | 1/0.7 | EO/PO (1.5/1.0) | 885 | 5280 | 46 | 325 | 100 | 69.2 |
| 76 | X | sorbitol | 1/0.15 | EO/PO (1.0/1.0) | 70 | 4440 | 41 | 305 | 90 | 70.5 |
| 77 | Y | glycerol | 1/0.2 | EO/PO (2.0/1.0) | 93 | 5380 | 39 | 280 | 80 | 71.4 |
| 78 | Z | glycerol | 1/0.2 | EO/PO (2.0/1.0) | 93 | 5380 | 39 | 280 | 80 | 71.4 |
| 79 | A | 1,1,1-trimethylolhexane | 1/0.4 | EO/PO (3.0/1.0) | 104 | 5860 | 52 | 365 | 120 | 67.1 |
| 80 | B | D-glycero-D-glucoheptose | 1/0.1 | EO/PO (2.5/1.0) | 133 | 7260 | 54 | 380 | 130 | 65.8 |
| 81 | C | cellobiose | 1/0.04 | EO/PO (0.5/1.0) | 330 | 18500 | 53 | 270 | 70 | 74.1 |

*1 A symbol which means a mixture of fatty acids constituting a fat and oil is described.
*2 Alkylene oxides were added by random addition.

| No. | Fat and Oil (α)*1 | Alcohol (β) | α/β mol. ratio | AO*2 (mol. ratio) | AO/α mol. ratio | Total M.W. | Deinking Performance Total remaining ink spots | Foam Vol. (ml) $H_0$ | Foam Vol. (ml) $H_1$ | (%) Foam breakage |
|---|---|---|---|---|---|---|---|---|---|---|
| Comparative products | | | | | | | | | | |
| 82 | r | glycerol | 1/0.2 | EO/PO (2.0/1.0) | 93 | 5380 | 126 | 695 | 350 | 49.6 |
| 83 | s | pentaerythritol | 1/0.3 | EO/PO (2.5/1.0) | 57.5 | 3630 | 149 | 790 | 465 | 41.1 |
| 84 | t | pentaerythritol | 1/0.3 | EO/PO (2.5/1.0) | 57.5 | 3570 | 153 | 795 | 465 | 41.5 |
| 85 | u | pentaerythritol | 1/0.3 | EO/PO (2.5/1.0) | 57.5 | 3620 | 152 | 795 | 460 | 42.1 |
| 86 | v | pentaerythritol | 1/0.3 | EO/PO (2.5/1.0) | 57.5 | 3610 | 154 | 805 | 470 | 41.6 |
| 87 | w | pentaerythritol | 1/0.3 | EO/PO (2.5/1.0) | 57.5 | 3600 | 150 | 810 | 465 | 42.6 |
| 88 | beef tallow | cyclodecanol | 1/1 | EO/PO (1.0/1.0) | 52 | 3640 | 154 | 805 | 470 | 41.6 |
| 89 | coconut oil | butylene glycol | 1/0.7 | EO/PO (1.5/1.0) | 88.5 | 5180 | 156 | 820 | 475 | 42.1 |
| 90 | soybean oil | 1,1,1-trimethylolhexane | 1/0.4 | EO/PO (3.0/1.0) | 104 | 5870 | 155 | 825 | 475 | 42.4 |
| 91 | palm oil | D-glycero-D-glucoheptose | 1/0.1 | EO/PO (2.5/1.0) | 133 | 7260 | 159 | 830 | 470 | 43.4 |
| 92 | rapeseed oil | cellobiose | 1/0.04 | EO/PO (0.5/1.0) | 330 | 18700 | 162 | 695 | 350 | 49.6 |
| 93 | lauric acid | $(EO)_{30}(PO)_{15}$ | | | | | 178 | 850 | 475 | 44.1 |

*1 A symbol which means a mixture of fatty acids constituting a fat and oil (in Nos. 82 to 87) or a name of a fat and oil (in Nos. 88 to 92) is described.
*2 Alkylene oxides were added by random addition.

EXAMPLE 4

In this Example, a deinking composition consisting essentially of a deinking agent was added in portions in the pulping step and in the preflotation step.

Collected waste newspapers were cut into pieces (2×5 cm). A given amount thereof was fed into a bench disintegrator. Then, an appropriate amount of water, 0.2% by weight (based on the collected waste newspapers used) of caustic soda and 0.1% by weight (based on of the flotation, the pulp slurry was concentrated on a 60-mesh wire gauze so as to give a pulp concentration of 4% by weight and then diluted with water so as to give a pulp concentration of 1% by weight. Subsequently, it was treated on a TAPPI standard sheet machine to thereby give a pulp sheet.

The hardness of the water employed above was 40° dH. The hardness was adjusted with the use of CaCl$_2$ and MgCl$_2$ at a molar ratio of Ca:Mg being 8:2.

The total ink spots remaining in the obtained pulp sheet were counted with an image analyzer (100×magnification).

Table 6 shows the deinking agents (i.e., deinking compositions herein) used, the deinking performances thereof and defoaming properties thereof.

TABLE 6

| No. | Fat and Oil (α)*1 | Alcohol (β) | α/β mol. ratio | AO*2 (mol. ratio) | AO/α mol. ratio | Total M.W. | Deinking Performance Total remaining ink spots | Defoaming Property Foam Vol. (ml) H$_0$ | Defoaming Property Foam Vol. (ml) H$_1$ | (%) Foam breakage |
|---|---|---|---|---|---|---|---|---|---|---|
| Invention products | | | | | | | | | | |
| 94 | A | glycerol | 1/0.3 | EO/PO (2.0/1.0) | 915 | 45400 | 79 | 495 | 235 | 52.5 |
| 95 | A | glycerol | 1/0.3 | EO/PO (2.0/1.0) | 82.5 | 4880 | 41 | 285 | 80 | 71.9 |
| 96 | A | glycerol | 1/0.3 | EO/PO (2.0/1.0) | 91 | 1300 | 82 | 280 | 105 | 62.5 |
| 97 | G | sorbitol | 1/0.15 | EO | 85 | 4610 | 51 | 395 | 135 | 65.8 |
| 98 | G | ethanol | 1/0.15 | EO/PO (1.0/1.0) | 0.8 | 890 | 94 | 370 | 125 | 66.2 |
| 99 | G | ethanol | 1/0.15 | EO/PO (1.0/1.0) | 182 | 10100 | 85 | 460 | 225 | 51.1 |
| Comparative products | | | | | | | | | | |
| 100 | c | glycerol | 1/0.3 | EO/PO (2.0/1.0) | 150 | 8170 | 126 | 740 | 380 | 48.6 |
| 101 | c | glycerol | 1/0.3 | EO/PO (2.0/1.0) | 82.5 | 4880 | 135 | 725 | 370 | 49.0 |
| 102 | c | glycerol | 1/0.3 | EO/PO (2.0/1.0) | 45 | 3060 | 147 | 690 | 345 | 50.0 |
| 103 | beef tallow | sorbitol | 1/0.15 | EO | 85 | 4610 | 150 | 840 | 495 | 41.1 |
| 104 | beef tallow | sorbitol | 1/0.15 | EO | 62 | 3600 | 168 | 825 | 475 | 42.4 |
| 105 | beef tallow | sorbitol | 1/0.15 | EO | 24 | 1920 | 173 | 810 | 460 | 43.2 |
| 106 | beef tallow | sorbitol | 1/0.15 | EO/PO (1.0/1.0) | 80 | 4950 | 176 | 720 | 405 | 43.8 |
| 107 | beef tallow | sorbitol | 1/0.15 | EO/PO (1.0/1.0) | 1200 | 62100 | 152 | 835 | 490 | 41.3 |

*1 A symbol which means a mixture of fatty acids constituting a fat and oil (in Nos. 94 to 102) or a name of a fat and oil (in Nos. 103 to 107) is described.
*2 Alkylene oxides were added by random addition in Nos. 94 to 96, 100 to 102, 106 and 107, and by block addition in Nos. 98 and 99.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A deinking composition consisting essentially of a reaction product obtained by adding at least one alkylene oxide to a reaction product of a fat or oil, or a mixture of a fat and oil with a mono to tetradeca-hydric alcohol, said fat or oil being a mono-, di- or triglyceride or a mixture of a mono-, di- or triglyceride, said mono, di- or triglyceride being made from a mixture of higher fatty acids, having from 8 to 24 carbon atoms, having an average carbon number of from 12.7 to 22.5; containing from 9.6 to 70.6% by weight of higher fatty acids having 20 to 24 carbon atoms, and having an iodine value of 70 or less.

2. The deinking composition as claimed in claim 1, wherein the mixture of higher fatty acids contains from 2.0 to 33.2% by weight of fatty acids having 20 carbon atoms and from 9.5 to 32.0% by weight of fatty acids having 22 carbon atoms.

3. The deinking composition as claimed in claim 1, wherein the mixture of higher fatty acids comprises semi-hardened or hardened fish oil fatty acids.

4. The deinking composition as claimed in claim 1, wherein the fat or oil comprises semi-hardened or hardened fish oil.

5. The drinking composition as claimed in claim 1, wherein the molar ratio of the mono- to tetradecahydric alcohol to glycerol in the fat and oil and/or the reaction product ranges from 0.02/1 to 1/1.

6. The deinking composition as claimed in claim 1, wherein the alkylene oxide is a mixture of ethylene oxide and propylene oxide.

7. The deinking composition as claimed in claim 1, wherein the mono- to tetradecahydric alcohol is glycerol.

* * * * *